US011128836B2

(12) United States Patent
Leppanen et al.

(10) Patent No.: US 11,128,836 B2
(45) Date of Patent: Sep. 21, 2021

(54) MULTI-CAMERA DISPLAY

(71) Applicant: Nokia Technologies Oy, Espoo (FI)

(72) Inventors: Jussi Artturi Leppanen, Tampere (FI); Miikka Vilermo, Siuro (FI); Antti Eronen, Tampere (FI)

(73) Assignee: Nokia Technolgies Oy, Espoo (FI)

( * ) Notice: Subject to any disclaimer, the term of this patent is extended or adjusted under 35 U.S.C. 154(b) by 0 days.

(21) Appl. No.: 16/957,778

(22) PCT Filed: Dec. 20, 2018

(86) PCT No.: PCT/IB2018/060466
§ 371 (c)(1),
(2) Date: Jun. 25, 2020

(87) PCT Pub. No.: WO2019/130183
PCT Pub. Date: Jul. 4, 2019

(65) Prior Publication Data

US 2021/0067738 A1 Mar. 4, 2021

(30) Foreign Application Priority Data

Dec. 27, 2017 (EP) .................................... 17210623

(51) Int. Cl.

| | |
|---|---|
| ***H04N 7/14*** | (2006.01) |
| ***G06F 3/01*** | (2006.01) |
| ***H04M 1/02*** | (2006.01) |
| ***H04M 3/56*** | (2006.01) |

(52) U.S. Cl.
CPC ............ *H04N 7/147* (2013.01); *G06F 3/013* (2013.01); *H04M 1/0264* (2013.01); *H04M 3/567* (2013.01); *H04N 7/144* (2013.01)

(58) Field of Classification Search
CPC .. H04N 7/15; H04N 7/14; G06F 3/01; H04M 1/02
USPC ............................ 348/14.01–14.16; 715/752
See application file for complete search history.

(56) References Cited

U.S. PATENT DOCUMENTS

2011/0078591 A1* 3/2011 van Os .................. G09G 3/003 715/756
2012/0274736 A1* 11/2012 Robinson .............. H04L 65/403 348/14.16
2013/0229483 A1 9/2013 Venolia et al. ............ 348/14.08
2014/0253669 A1* 9/2014 Kim ....................... H04N 7/142 348/14.07

(Continued)

FOREIGN PATENT DOCUMENTS

WO WO 2014/149776 A1 9/2014

*Primary Examiner* — Melur Ramakrishnaiah
(74) *Attorney, Agent, or Firm* — Harrington & Smith

(57) ABSTRACT

A first input and a second input are received from a front camera and a rear camera respectively of a user device The first input is a video of a first object having a first orientation with respect to the front camera, the second input is a video of a second object having a second orientation with respect to the rear camera. A video output is generated including a first part based on the first input and a second part based on the second input. The video output is presented relative to a viewpoint of a first viewer, such that, at the viewpoint, the first and second parts of the video output are visible at the same time and the first object in the first part of the video output is orientated towards the second object in the second part of the video output.

20 Claims, 8 Drawing Sheets

15
13
12
14
16
10

(56) References Cited

U.S. PATENT DOCUMENTS

| | | | | |
|---|---|---|---|---|
| 2014/0267870 | A1* | 9/2014 | Liu | H04N 1/00172 348/333.05 |
| 2016/0006985 | A1* | 1/2016 | Hines | H04N 13/167 348/14.08 |
| 2016/0205302 | A1* | 7/2016 | Desai | H04N 5/76 386/223 |
| 2017/0075117 | A1 | 3/2017 | Lin et al. | |
| 2018/0103213 | A1* | 4/2018 | Holzer | H04N 5/232935 |

* cited by examiner

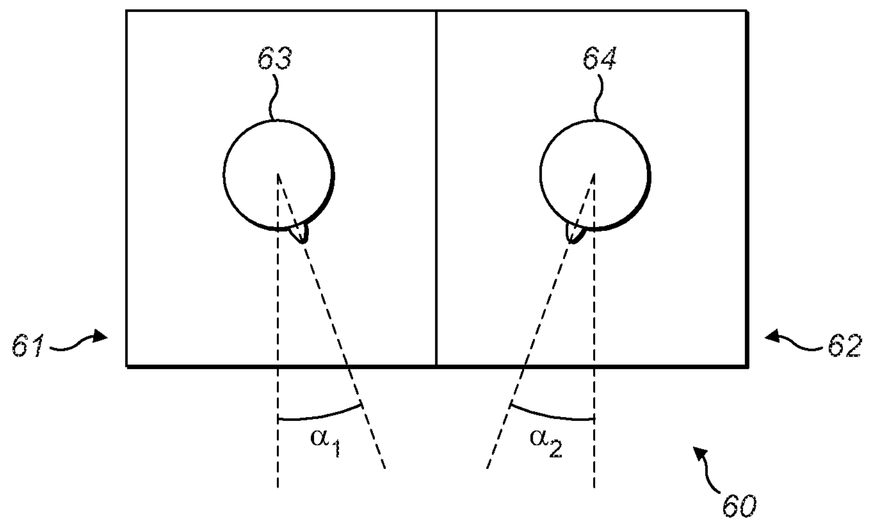
FIG. 6
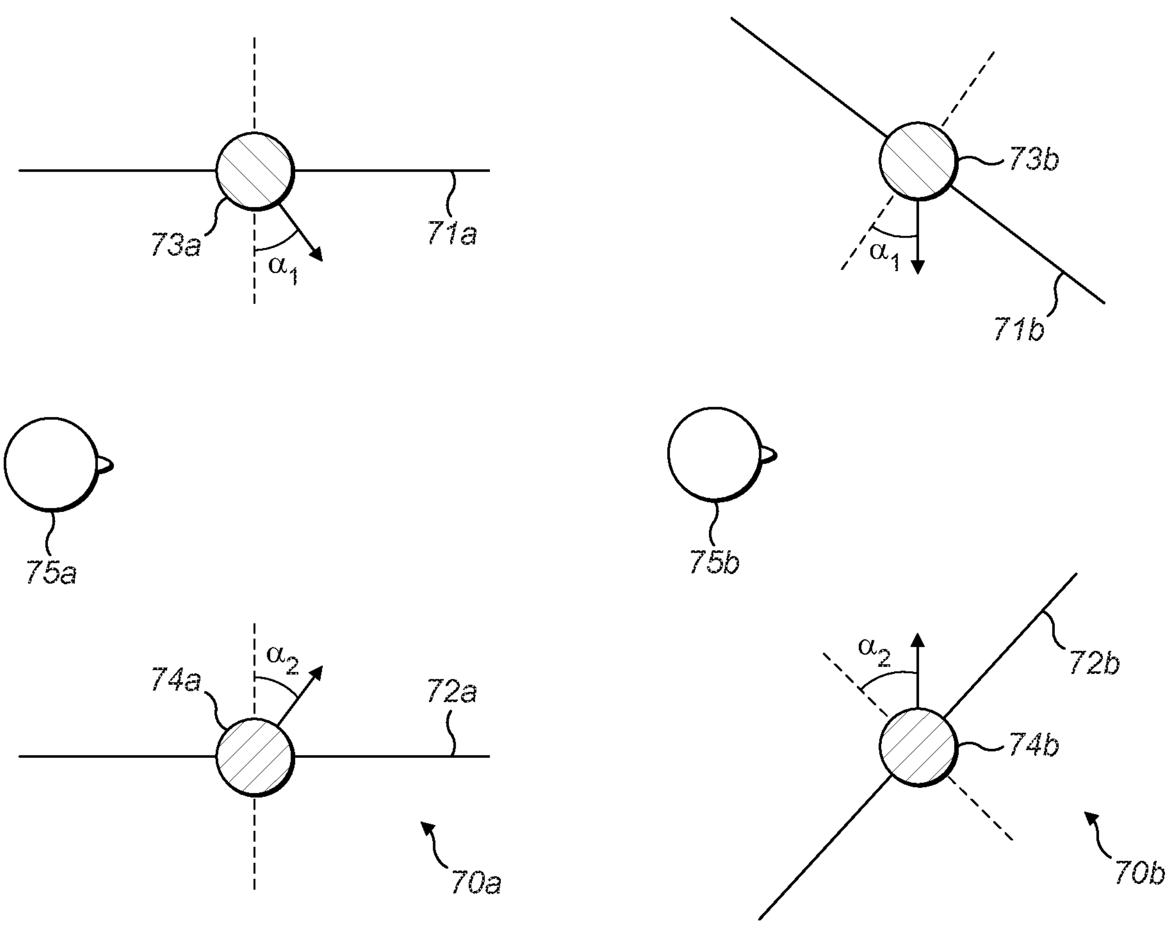
FIG. 7a
FIG. 7b

MULTI-CAMERA DISPLAY

FIELD

The present specification relates to capturing video content using a multi-camera device, such as a suitable mobile communication device.

BACKGROUND

Mobile communication devices may include video cameras. Moreover, mobile communication devices may provide such cameras on both the front and rear of a mobile communication device (or some other device). Content from the front and rear camera may then be presented next to each other. Such a presentation of visual data may not be an optimally convenient output when the front and rear cameras are used to capture content from a first and second people respectively having a dialogue.

SUMMARY

In a first aspect, this specification describes a method comprising: receiving a first input and a second input from a front camera and a rear camera respectively of a user device, wherein: the first input is a video of a first object having a first orientation with respect to the front camera, the second input is a video of a second object having a second orientation with respect to the rear camera; generating a video output comprising a first part based on the first input and a second part based on the second input; and presenting the video output relative to a viewpoint of a first viewer, such that, at the viewpoint, the first and second parts of the video output are visible at the same time and the first object in the first part of the video output is orientated towards the second object in the second part of the video output. The viewpoint of the first viewer may be variable. The first and second inputs may be received at the same time. The user device may be a mobile communication device.

The first part of the video output may include a face of the first object and the second part of the video output may include a face of the second object, wherein presenting the video output, such that the first object in the first part of the video output is orientated towards the second object in the second part of the video output, may comprise orientating the first and second parts of the video outputs such that, at the viewpoint, the faces of the first and second objects are directed towards one another.

The method may further comprise: determining the first orientation by determining an angle between the orientation of the first object and the first camera; and determining the second orientation by determining an angle between the orientation of the second object and the second camera. The orientations of the first and second objects may be determined from a detected eye or face direction relative to the first and second cameras respectively.

The method may further comprise: generating a three-dimensional model of the first object from the first input; and generating a three-dimensional model of the second object from the second input, wherein: the first and second parts of the video output include the three-dimensional models of the first and second objects respectively; and presenting the video output such that the first object in the first video output is orientated towards the second object in the second video output comprises rotating the three-dimensional models of the first and/or second objects such that, at the viewpoint, the models of the first and second objects are directed towards each other.

The video output may be a virtual output, wherein presenting the video may include presenting the video output in a virtual reality environment.

In a second aspect, this specification describes an apparatus configured to perform any method as describes with reference to the first aspect.

In a third aspect, this specification describes computer-readable instructions which, when executed by computing apparatus, cause the computing apparatus to perform any method as described with reference to the first aspect.

In a fourth aspect, this specification describes an apparatus comprising: means for presenting a first part of a video output to a viewer, wherein the first part of the video output is based on a first input, wherein the first input is obtained from a front camera of a user device, wherein the first input is a video of first object having a first orientation with respect to the front camera; means for presenting a second part of a video output to the viewer, wherein the second part of the video output is based on a second input, wherein the second input is obtained from a rear camera of the user device, wherein the second input is a video of a second object having a second orientation with respect to the rear camera; and means for configuring the first and second parts of the video outputs relative to a viewpoint of a first viewer, such that, at the viewpoint: the first and second parts of the video output are visible at the same time, and the first object in the first video output is orientated towards the second object in the second video output.

The video output may be a virtual output. The apparatus may further comprise means for presenting the video output within a virtual reality environment.

The relative positions of the first and second displays may be determined by said configuring means.

The first part of the video output may include a face of the first object and the second part of the video output may include a face of the second object. The configuring means may be configured to present the video output such that the first object in the first part of the video output is orientated towards the second object in the second part of the video output by orientating the first and second parts of the video outputs such that the faces of the first and second objects are directed towards one another.

The configuring means may comprise: means for generating a three-dimensional model of the first object from the first input and a three-dimensional model of the second object from the second input, wherein the first and second parts of the video output include the three-dimensional models of the first and second objects respectively; and means for orientating the first part of the video output and the second part of the video output by rotating the three-dimensional models of the first and/or second objects such that, at the viewpoint, the models of the first and second objects are directed towards each other.

In a fifth aspect, this specification describes an apparatus comprising: at least one processor; and at least one memory including computer program code which, when executed by the at least one processor, causes the apparatus to: receive a first input and a second input from a front camera and a rear camera respectively of a user device, wherein: the first input is a video of a first object having a first orientation with respect to the front camera, the second input is a video of a second object having a second orientation with respect to the rear camera; generate a video output comprising a first part based on the first input and a second part based on the second input; and present the video output relative to a viewpoint of a first viewer, such that, at the viewpoint, the first and second parts of the video output are visible at the same time and the first object in the first part of the video output is orientated towards the second object in the second part of the video output.

In a sixth aspect, this specification describes: means for receiving a first input and a second input from a front camera and a rear camera respectively of a user device, wherein: the first input is a video of a first object having a first orientation with respect to the front camera, the second input is a video of a second object having a second orientation with respect to the rear camera; means for generating a video output comprising a first part based on the first input and a second part based on the second input; and means for presenting the video output relative to a viewpoint of a first viewer, such that, at the viewpoint, the first and second parts of the video output are visible at the same time and the first object in the first part of the video output is orientated towards the second object in the second part of the video output.

The first part of the video output may include a face of the first object and the second part of the video output may include a face of the second object. The presenting means may be configured to present the video output such that the first object in the first part of the video output is orientated towards the second object in the second part of the video output by orientating the first and second parts of the video outputs such that the faces of the first and second objects are directed towards one another.

Some embodiment may include: means for determining the first orientation by determining an angle between the orientation of the first object and the first camera; and means for determining the second orientation by determining an angle between the orientation of the second object and the second camera. The orientations of the first and second objects may be determined from a detected eye or face direction relative to the first and second cameras respectively.

The configuring means may comprise: means for generating a three-dimensional model of the first object from the first input and a three-dimensional model of the second object from the second input, wherein the first and second parts of the video output include the three-dimensional models of the first and second objects respectively; and means for orientating the first part of the video output and the second part of the video output by rotating the three-dimensional models of the first and/or second objects such that, at the viewpoint, the models of the first and second objects are directed towards each other.

In some embodiments, the viewpoint of the first viewer is variable.

The video output may be a virtual output. The apparatus may further comprise means for presenting the video output within a virtual reality environment.

In some embodiments, the first and second inputs are received at the same time.

In some embodiments, the user device is a mobile communication device.

In a seventh aspect, this specification describes an apparatus comprising: at least one processor; and at least one memory including computer program code which, when executed by the at least one processor, causes the apparatus to: present a first part of a video output to a viewer, wherein the first part of the video output is based on a first input, wherein the first input is obtained from a front camera of a user device, wherein the first input is a video of first object having a first orientation with respect to the front camera; present a second part of a video output to the viewer, wherein the second part of the video output is based on a second input, wherein the second input is obtained from a rear camera of the user device, wherein the second input is a video of a second object having a second orientation with respect to the rear camera; and configure the first and second parts of the video outputs relative to a viewpoint of a first viewer, such that, at the viewpoint: the first and second parts of the video output are visible at the same time, and the first object in the first video output is orientated towards the second object in the second video output.

In an eighth aspect, this specification describes a computer-readable medium having computer-readable code stored thereon, the computer readable code, when executed by the at least one processor, causes performance of: receiving a first input and a second input from a front camera and a rear camera respectively of a user device, wherein: the first input is a video of a first object having a first orientation with respect to the front camera, the second input is a video of a second object having a second orientation with respect to the rear camera; generating a video output comprising a first part based on the first input and a second part based on the second input; and presenting the video output relative to a viewpoint of a first viewer, such that, at the viewpoint, the first and second parts of the video output are visible at the same time and the first object in the first part of the video output is orientated towards the second object in the second part of the video output.

In a ninth aspect, this specification describes a computer-readable medium having computer-readable code stored thereon, the computer readable code, when executed by the at least one processor, causes performance of: presenting a first part of a video output to a viewer, wherein the first part of the video output is based on a first input, wherein the first input is obtained from a front camera of a user device, wherein the first input is a video of first object having a first orientation with respect to the front camera; presenting a second part of a video output to the viewer, wherein the second part of the video output is based on a second input, wherein the second input is obtained from a rear camera of the user device, wherein the second input is a video of a second object having a second orientation with respect to the rear camera; and configuring the first and second parts of the video outputs relative to a viewpoint of a first viewer, such that, at the viewpoint: the first and second parts of the video output are visible at the same time, and the first object in the first video output is orientated towards the second object in the second video output.

BRIEF DESCRIPTION OF THE DRAWINGS

Example embodiments will now be described, by way of non-limiting examples, with reference to the following schematic drawings, in which:

FIG. 6 shows an example view output by the system of FIG. 5;

FIGS. 7*a* and 7*b* show example views output by the system of FIG. 5;

DETAILED DESCRIPTION

Figure 1:
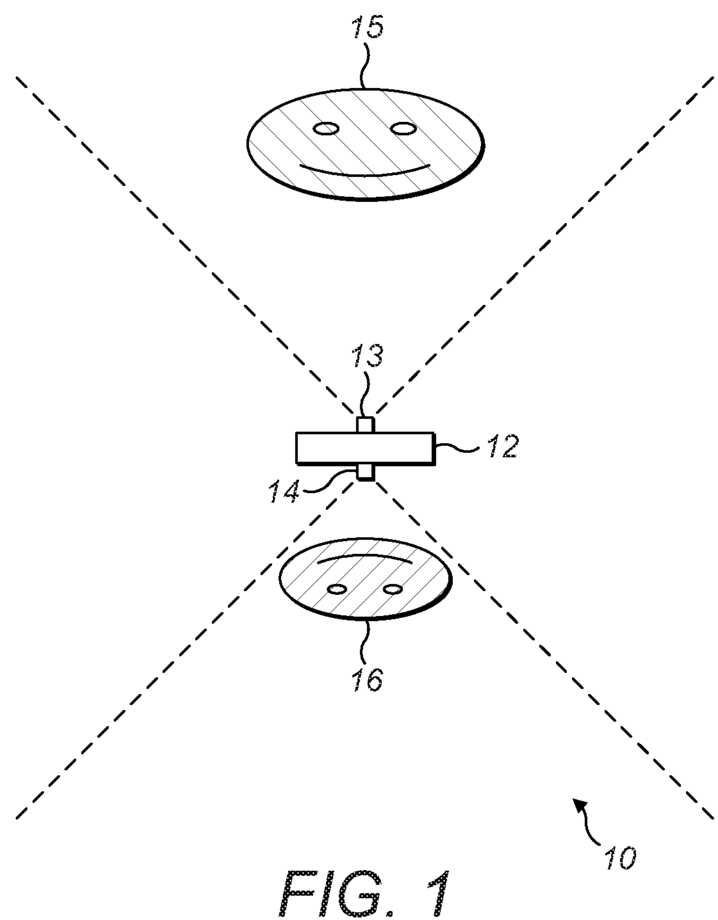
FIG. 1 is a block diagram of a system in accordance with an example embodiment.

FIG. 1 is a block diagram of a system, indicated generally by the reference numeral 10, in accordance with an example embodiment.

The system 10 comprises a user device 12, such as a mobile communication device (e.g. a mobile phone or a tablet computer). The user device 12 has a front camera 13 and a rear camera 14. The front camera 13 and the rear camera 14 may be video cameras or other types of camera capable of recording video.

A first object 15 is within a field of view of the front camera 13 (as indicated by dotted lines). A second object 16 is within a field of view of the rear camera 14 (as indicated by dotted lines). The first and second objects 15 and 16 may be two people having a conversation that is being recorded by the user device 12. As shown in FIG. 1, the first object 15 is orientated directly at the first camera 13 and the second object 16 is orientated directly at the second camera 14.

Figure 2A:
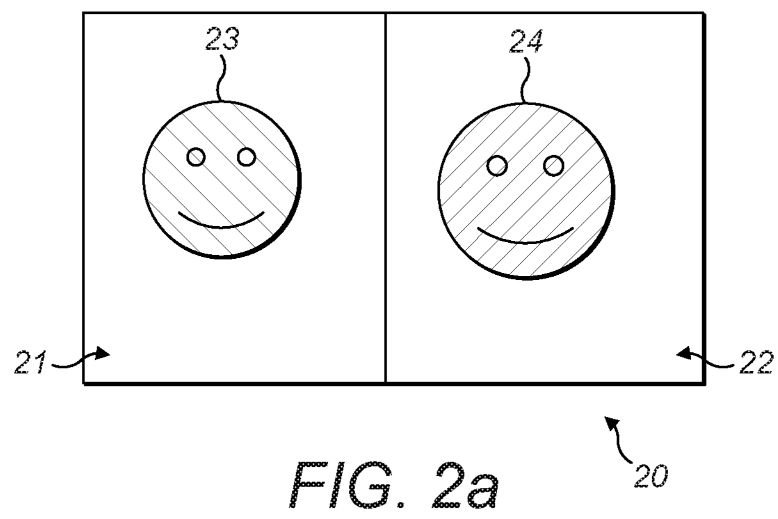
FIGS. 2*a* and 2*b* show example views output by the system of FIG. 1.

FIG. 2*a* shows an example view, indicated generally by the reference numeral 20, output by the user device 12 described above with reference to FIG. 1. The view 20 is a combined view that includes a first view 21 that is provided by the front camera 13 and a second view 22 that is provided by the rear camera 14. As shown in FIG. 2*a*, the combined view 20 displays the first and second views side-by-side. (Other display options are possible, such as displaying one view above the other.)

The first view 21 includes a first image 23 that is a representation of the first object 15. In a similar way, the second view 22 includes a second image 24 that is a representation of the second object 16.

As shown in FIG. 1, during image capture, the first and second objects are facing each other. However, in the example view 20 shown in FIG. 2*a*, the first and second images 23 and 24 are presented side-by-side.

Figure 2B:
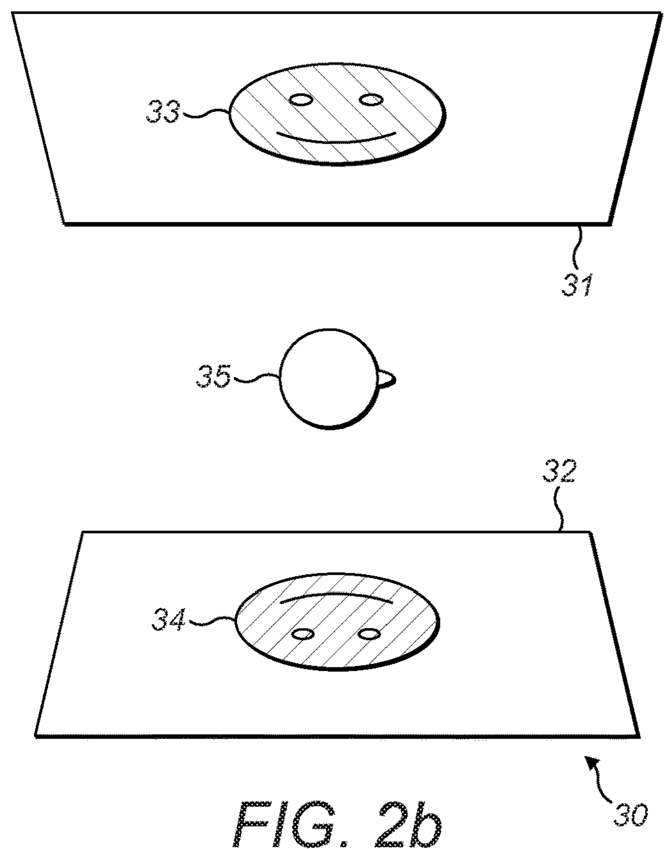

FIG. 2*b* shows an example view, indicated generally by the reference numeral 30, output by the system of FIG. 1. The view 30 comprises a first display 31 showing a view provided by the front camera 13 and a second display 32 showing a view provided by the rear camera 14. As shown in FIG. 2*b*, the first display 31 presents a first image 33 that is a representation of the first object 15 and the second display 32 presents a second image 34 that is a representation of the second object 16. As shown in FIG. 2*b*, the first display 31 is opposite the second display 32.

A viewer 35 is shown placed between the first display 31 and the second display 32. From the point of view of the viewer 35, the first object 15 and second object 16 (i.e. the first image 33 and the second image 34) are directed towards each other.

Consider the following situation in which the first object 15 and the second object 16 are people engaged in a conversation and the viewer 35 is a person viewing that conversation. From the viewpoint of the viewer 35 in the view 30 shown in FIG. 2*b*, it appears that the first and second people (the representations 33 and 34 of the first and second objects respectively) are talking to each other.

The displays 31 and 32 may be real displays (e.g. screens) with images from the front and rear cameras 13 and 14 presented thereon. Alternatively, the displays 31 and 32 may be formed from one or more virtual displays that are displayed within a virtual reality or augmented reality environment. Thus, as discussed further below, the viewer 35 may wear a head mounted device (HMD) for viewing virtual displays 31 and 32 (or a single virtual display comprises a first part 31 and a second part 32).

Virtual reality (VR) is a rapidly developing area of technology in which video content is provided to a virtual reality display system. A virtual reality display system may be provided with a live or stored feed from a video content source, the feed representing a virtual reality space or world for immersive output through the display system. In some embodiments, audio is provided, which may be spatial audio. A virtual space or virtual world is any computer-generated version of a space, for example a captured real world space, in which a user can be immersed through a display system such as a virtual reality headset. A virtual reality headset may be configured to provide virtual reality video and audio content to the user, e.g. through the use of a pair of video screens and headphones incorporated within the headset.

Augmented Reality (AR) refers to a real-world view that is augmented by computer-generated sensory input.

Figure 3:
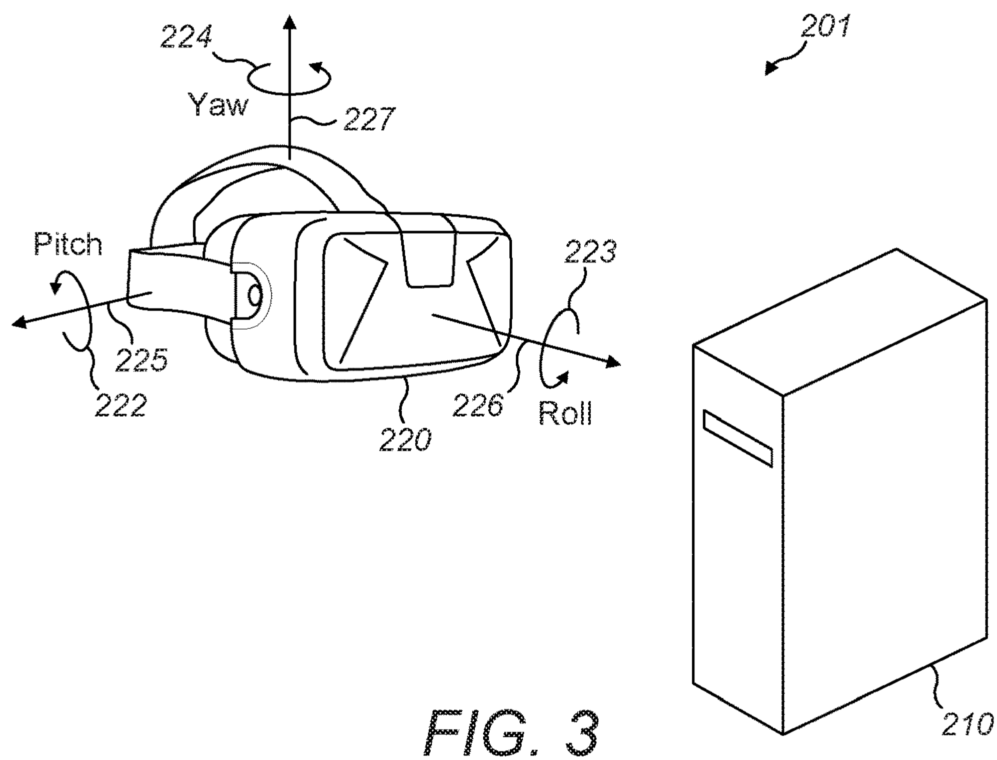
FIG. 3 shows a virtual reality or augmented reality display system.

FIG. 3 is a schematic illustration of a virtual reality or augmented reality display system 201 which represents user-end equipment. The system 201 includes a user device in the form of a virtual reality or augmented reality headset 220, for displaying visual data for a virtual reality or augmented reality space, and a media player 210 for rendering visual data on the headset 220. Headset 220 may comprise augmented reality (AR) glasses, which may enable visual content, for example one or more virtual objects, to be projected or displayed on top of a see-through portion of the glasses. In some example embodiments, a separate user control (not shown) may be associated with the display system 201, e.g. a hand-held controller.

The headset 220 receives the virtual reality or augmented reality content data from the media player 210. The media player 210 may be part of a separate device which is connected to the headset 220 by a wired or wireless connection.

Here, the media player 210 may comprise a mobile phone, smartphone or tablet computer configured to play content through its display. For example, the media player 210 may be a touchscreen device having a large display over a major surface of the device, through which video content can be displayed. The media player 210 may be inserted into a holder of a headset 220. With such headsets 220, a smart phone or tablet computer may display visual data which is provided to a user's eyes via respective lenses in the headset 220. The virtual reality or augmented reality display system 201 may also include hardware configured to convert the device to operate as part of display system 201. Alternatively, the media player 210 may be integrated into the headset 220. The media player 210 may be implemented in software. In some example embodiments, a device comprising virtual reality (or augmented reality) media player software is referred to as the virtual reality (or augmented reality) media player 210.

The display system 201 may include means for determining the spatial position of the user and/or orientation of the user's head. This may be by means of determining the spatial position and/or orientation of the headset 220. Over successive time frames, a measure of movement may therefore be calculated and stored. Such means may comprise part of the media player 210. Alternatively, the means may comprise part of the headset 220. For example, the headset 220 may incorporate motion tracking sensors which may include one or more of gyroscopes, accelerometers and structured light systems. These sensors may generate position data from which a current visual field-of-view (FOV) is determined and updated as the user, and so the headset 220, changes position and/or orientation. The headset 220 may comprise two digital screens for displaying stereoscopic video images of the virtual world in front of respective eyes of the user, and also two speakers for delivering audio, if provided from the media player 210. The example embodiments herein are not limited to a particular type of headset 220.

In some example embodiments, the display system 201 may determine the spatial position and/or orientation of the user's head using a six degrees of freedom (6DoF) method. As shown in FIG. 3, these include measurements of pitch 222, roll 223 and yaw 224 and also translational movement in Euclidean space along side-to-side, front-to-back and up-and-down axes 225, 226 and 227. (The use of a six degrees of freedom headset is not essential. For example, a three degrees of freedom headset could readily be used.)

The display system 201 may be configured to display virtual reality or augmented reality content data to the user based on spatial position and/or the orientation of the headset 220 (e.g. the position of the viewer 35 in the view 30 may be determined by the position of the headset 220). A detected change in spatial position and/or orientation, i.e. a form of movement, may result in a corresponding change in the visual data to reflect a position or orientation transformation of the user with reference to the space into which the visual data is projected. This allows virtual reality content data to be consumed with the user experiencing a 3D virtual reality or augmented reality environment.

Audio data may also be provided to headphones provided as part of the headset 220. The audio data may represent spatial audio source content. Spatial audio may refer to directional rendering of audio in the virtual reality or augmented reality space such that a detected change in the user's spatial position or in the orientation of their head may result in a corresponding change in the spatial audio rendering to reflect a transformation with reference to the space in which the spatial audio data is rendered.

The angular extent of the environment observable through the headset 220 is called the visual field of view (FOV). The actual field of view observed by a user depends on the inter-pupillary distance and on the distance between the lenses of the headset 220 and the user's eyes, but the field of view can be considered to be approximately the same for all users of a given display device when the headset 220 is being worn by the user.

The arrangement 30 can effectively place the viewer 35 in the middle of an interaction (e.g. a conversation) between the first object 15 and the second object 16. This is particularly true when the video output described above is combined with spatial audio data that is positioned to match the positions of the first image 33 and the second image 34 from the point of view of the viewer 35. However, the system 30 is relatively inconvenient because the viewer 35 needs to change their head position significantly in order to change from viewing the first image to the second image (or vice-versa).

Figure 4:
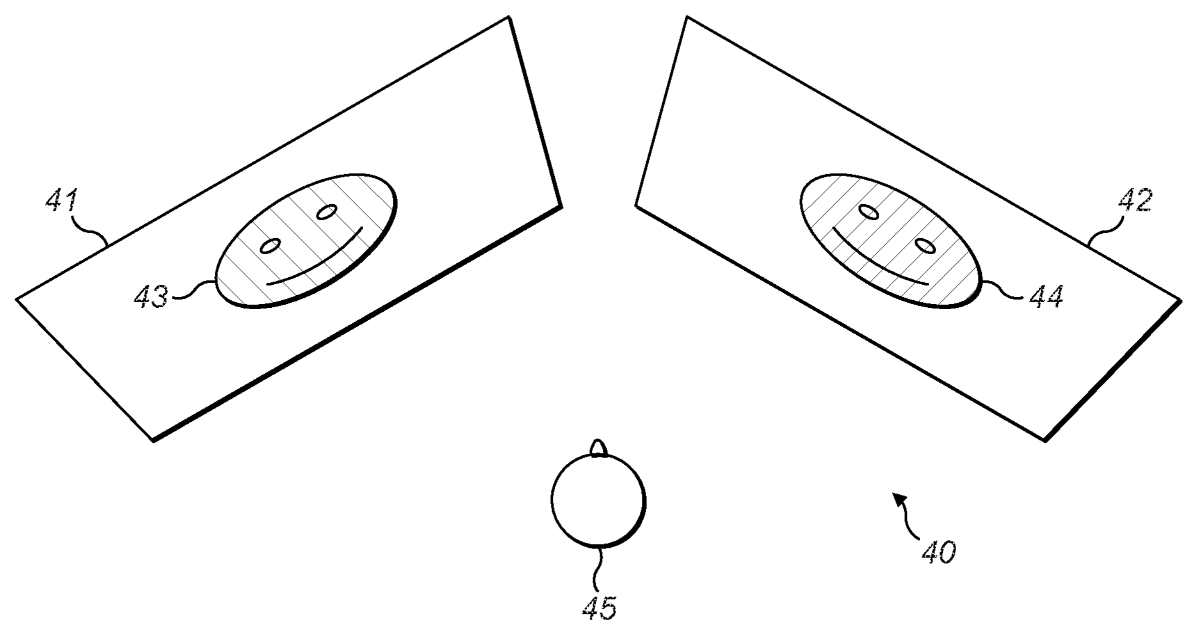
FIG. 4 shows an example views output by the system of FIG. 1.

FIG. 4 shows an example view, indicated generally by the reference numeral 40, output by the system of FIG. 1 in accordance with an example embodiment. The view 40 comprises a first display 41 showing a view provided by the front camera 13 and a second display 42 showing a view provided by the rear camera 14. As shown in FIG. 4, the first display 41 presents a first image 43 that is a representation of the first object 15 and the second display 42 presents a second image 44 that is a representation of the second object 16.

The first display 41 and the second display 42 may be provided within a virtual reality display system, such as the system 201 described above, with the viewer 45 experiencing the content by means of the head mounted device 220. In this context, the first display 41 and the second display 42 may be provided as different parts of a single overall display provided to the viewer 45.

As shown in FIG. 4, the first display 41 and second display 42 are angled towards each other so that a viewer 45 can see both displays at the same time. Thus, the view 40 may be more convenient for the viewer 45 than the view 30 described above with reference to FIG. 3. However, the first image 43 and second image 44 are no longer directed to one another, so the images of the first and second objects are no longer directed towards one another. Thus, in the example above of a conversation taking place, the viewer 45 can see both participants in the conversation, but the participants are not directed towards one another whilst conversing.

Figure 5:
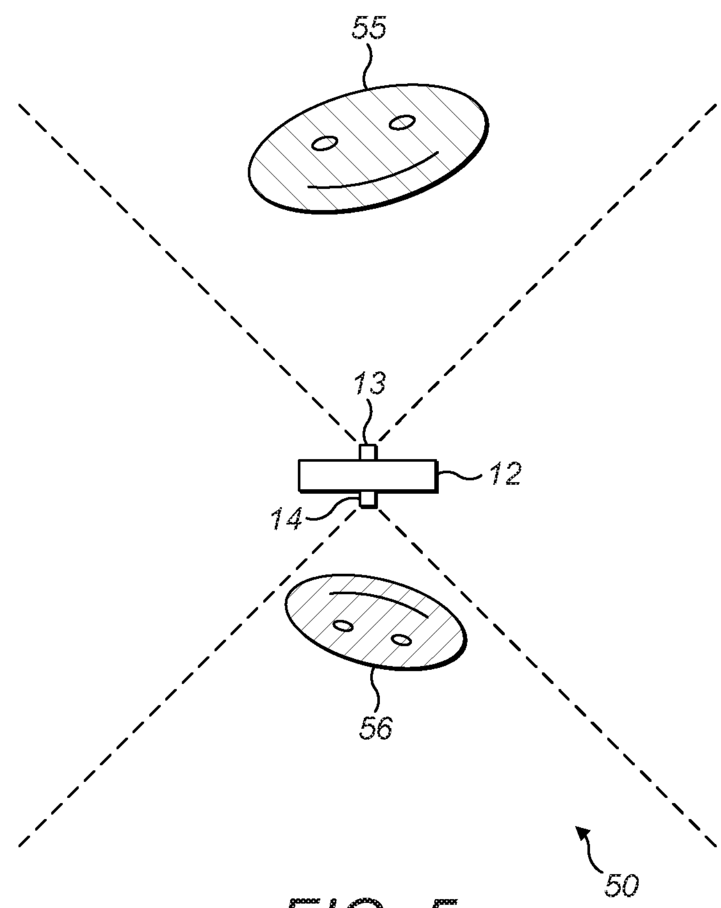
FIG. 5 is a block diagram of a system in accordance with an example embodiment.

FIG. 5 is a block diagram of a system, indicated generally by the reference numeral 50, in accordance with an example embodiment. The system 50 is similar to the system 10 described above with reference to FIG. 1.

The system 50 comprises the user device 12 described above, including the front camera 13 and the rear camera 14. A first object 55 is within a field of view of the front camera 13 (as indicated by dotted lines). A second object 56 is within a field of view of the rear camera 14 (as indicated by dotted lines). The first and second objects 55 and 56 may be two people having a conversation that is being recorded by the user device 12. As shown in FIG. 5, both the first object 55 and the second object 56 are angled relative to the user device 12, such that neither object is orientated directly towards the respective camera of the user device. As described in detail below, the first object 55 has a first orientation with respect to the front camera 13 and the second object 56 has a second orientation with respect to the rear camera that can be exploited when presenting one or more displays to a viewer.

FIG. 6 shows an example view, indicated generally by the reference numeral 60, output by the user device 12 described above with reference to FIG. 5. The view 60 is a combined view that includes a first view 61 that is provided by the front camera 13 and a second view 62 that is provided by the rear camera 14. As shown in FIG. 6, the combined view 60 displays the first and second views side-by-side, such that the combined view 60 is similar to the combined view 20 described above.

The first view 61 includes a first image 63 that is a representation of the first object 55. In a similar way, the second view 62 includes a second image 64 that is a representation of the second object 56. Since the first and second objects 55 and 56 are not orientated directly towards the respective cameras of the user device, in the first and second images 63 and 64 of those objects, those objects are presented at an angle. Indeed, as shown in FIG. 6, the object in the first image 63 has an angle $\alpha_1$ relative to the display and the second image 64 has an angle $\alpha_2$ relative to the display.

FIG. 7*a* shows an example view, indicated generally by the reference numeral 70*a*, output by the system of FIG. 5 in accordance with an example embodiment. The view 70*a* comprises a first display 71*a* showing a view provided by the front camera 13 and a second display 72*a* showing a view provided by the rear camera 14. As shown in FIG. 7*a*, the first display 71*a* presents a first image 73*a* that is a representation of the first object 55 and the second display 72*a* presents a second image 74*a* that is a representation of the second object 56.

The view 70*a* is similar to the view 30 described above with reference to FIG. 2*b* in that the first display 71*a* is provided opposite the second display 72*a*, with a viewer 75*a* between the displays. However, since the objects 55 and 56 are not directed towards the camera 13 and 14, the first images 73*a* and the second image 73*b* are not directed towards one another. Thus, in the example above of a conversation taking place, the viewer 75*a* can see both participants in the conversation, but the participants are not directed towards one another whilst conversing.

FIG. 7*b* shows an example view, indicated generally by the reference numeral 70*b*, output by the system of FIG. 5 in accordance with an example embodiment. The view 70*b* comprises a first display 71*b* showing a view provided by the front camera 13 and a second display 72*b* showing a view provided by the rear camera 14. As shown in FIG. 7*b*, the first display 71*b* presents a first image 73*b* that is a representation of the first object 55 and the second display 72*b* presents a second image 74*b* that is a representation of the second object 56. The view 70*b* differs from the view 70*a* described above in that the first display 71*b* and second display 72*b* are angled towards each other such that, from the viewpoint of a viewer 75*b*, the first and second images 73*b* and 74*b* are directed (i.e. orientated) towards one another. Thus, in the example above of a conversation taking place, the viewer 75*b* can not only see both participants in the conversation, but the participants are directed towards one another whilst conversing.

Specifically, as shown in FIG. 7*b*, the displays 71*b* is rotated by the angle $\alpha_1$ relative to the display 71*a* and the display 72*b* is rotated by the angle $\alpha_2$ relative to the display 72*a* such that first image and the second image are directed towards one another.

Again, displays 71*a*, 71*b*, 72*a* and 72*b* may be provided within a virtual reality display system, such as the system 201 described above, with the viewers 75*a* and 75*b* experiencing the content by means of the head mounted device 220. In this context, the first display 71*a* and the second display 72*a* may be provided as different parts of a single overall display provided to the viewer 75*a* and, similarly, the first display 71*b* and the second display 72*b* may be provided as different parts of a single overall display provided to the viewer 75*b*.

Figure 8:
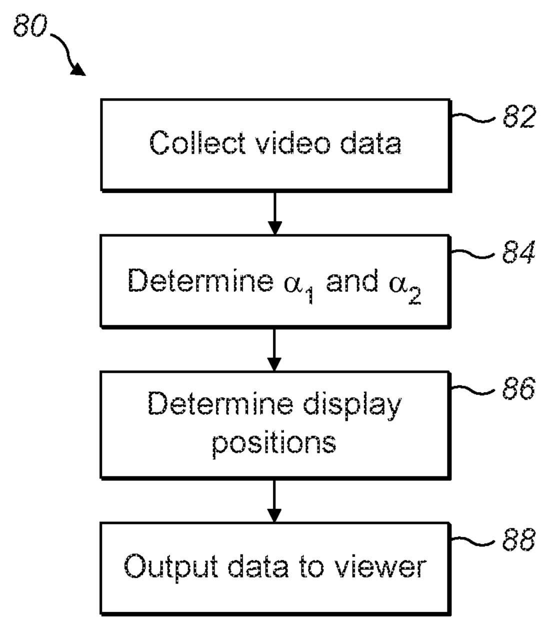
FIG. 8 is a flow chart showing an algorithm in accordance with an example embodiment.

FIG. 8 is a flow chart showing an algorithm, indicated generally by the reference numeral 80, in accordance with an example embodiment. The algorithm 80 may be used to generate the view 70*b* described above.

The algorithm 80 starts at operation 82 where video data is collected by the front camera 13 and rear camera 14 of the user device 12.

At operation 84, the angles $\alpha_1$ and $\alpha_2$ are calculated in order to determine the orientation of the first and second objects 55 and 56 relative to the front and rear cameras 13 and 14 respectively. Many algorithms exist for implementing such a step. By way of example, where the first image 73 and the second image 74 are images of human faces, one technique is to detect the direction of the eyes of the faces in the images, for example by using image-based parameterized tracking for face features to locate an area in which a sub-pixel parameterized shape estimation of an eye's boundary is performed. This could be implemented by tracking, for example, five points of an object's face (four at the eye corners and a fifth at the tip of the nose). Many other algorithms will be apparent to persons skilled in the art. It should also be noted that the eyes may be orientated in a different direction to the remainder of the face. The operation 84 could be based on detecting the direction of the eyes alone, detecting the overall direction of the eyes and the face, or detecting the direction of the face (and not the eyes). The direction of the face could be determined, for example, based on the orientation of features such as the nose and chin of the face.

In the event that the first image 73 and the second image 74 are not images of human faces, other mechanisms are required for determining the angles $\alpha_1$ and $\alpha_2$, such as identifying a location of one or more marker points on the images.

The operation 84 may detect a snapshot of the relevant angle at a particular moment of time. Alternatively, an average angle over a defined time period may be determined. It should be noted that, in the event that the displays 71*b* and 72*b* are virtual displays, they can be readily moved to accommodate changes in the angles detected in the operation 84.

At operation 86, the relative positions of the displays 71*b* and 72*b* are determined. This is can be done once the angles $\alpha_1$ and $\alpha_2$ have been calculated in the operation 84 described above. It should be noted that if the orientation of either the first object 55 or the second object 56 relative to the user device 12 changes, then the optimum relative positions of the displays 71*b* and 72*b* will change. In the event that the displays 71*b* and 72*b* are virtual displays within a virtual reality environment, it is relatively simple to move the displays within the virtual space, since this simply requires changing the position with the virtual space at which the images 73 and 74 are presented. However, it is should be noted that moving displays too readily may be distracting for the viewer, thus the algorithm 80 may be arranged to limit the rate at which the operation 86 is updated. Thus, for example, a filtering step may be provided to limit the rate at which the positions of the images within the virtual space changes relative to the rate at which the calculated optimum position for those images changes.

Of course, in the event that the displays 71*b* and 72*b* are real displays, it is possible, albeit cumbersome, to move the displays in response to changes in the calculated optimum positions for those displays. In such a context, it is possible that a compromise position for the displays 71*b* and 72*b* may be selected, such that the displays are close to the optimum position most of the time.

At operation 88, data is output to the viewer.

In some embodiments, cameras of mobile communication and similar devices may be provided at one end (e.g. the top) of the device 12 (rather than in the middle, as suggested in FIGS. 1 and 5). Accordingly, video recordings of users of such devices (such as the objects 15, 16, 55 and 56) may be at an angle to the display, as indicated schematically in FIG. 5.

Figure 9:
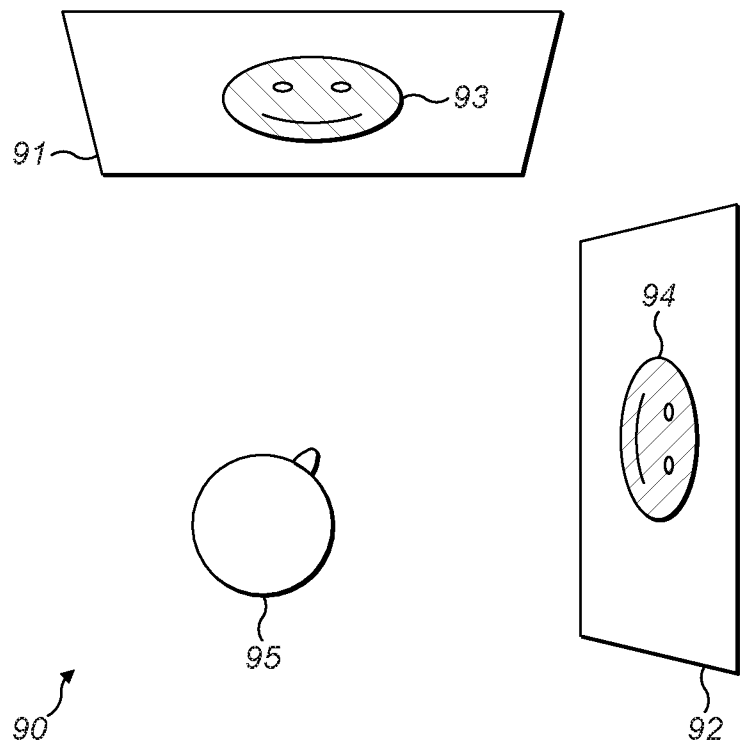
FIGS. 9 to 11 show example views output in accordance with an example embodiment.

FIG. 9 shows an example view, indicated generally by the reference numeral 90, output by the user device 12 described above with reference to FIG. 1. The view 90 includes a first display 91 that is provided by the front camera 13 and a second display 92 that is provided by the rear camera 14. The first view 91 includes a first image 93 that is a representation of the first object 15. In a similar way, the second view 92 includes a second image 94 that is a representation of the second object 16. A viewer 95 is shown in FIG. 9 and is able to view both the first view 93 and the second view 94. As described above, the displays 91 and 92 may be implemented within a virtual reality environment. In this context, the first display 91 and the second display 92 may be provided as different parts of a single overall display provided to the viewer 95.

Figure 10:
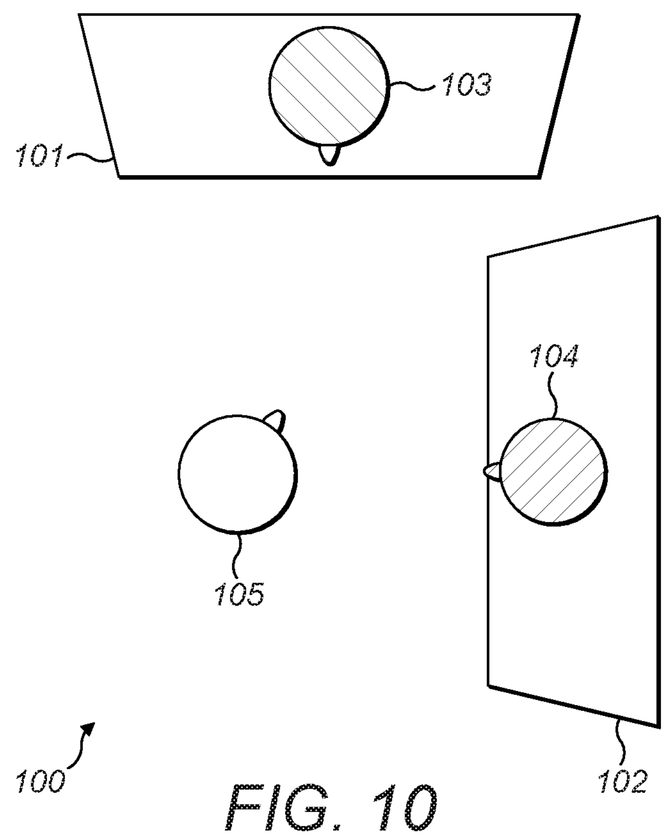

FIG. 10 shows an example view, indicated generally by the reference numeral 100, output by the user device 12 described above with reference to FIG. 1. The view 100 includes a first display 101 that is provided by the front camera 13 and a second display 102 that is provided by the rear camera 14. The first view 101 includes a first image 103 that is a representation of the first object 15. In a similar way, the second view 102 includes a second image 104 that is a representation of the second object 16. A viewer 105 is shown in FIG. 10 and is able to view both the first view 103 and the second view 104.

The view 100 differs from the view 90 in that the first and second images 103 and 104 are three-dimensional models of the respective objects, rather than two-dimensional images of the objects captured by the video cameras 13 and 14.

In common with the view 40 described above with reference to FIG. 4, the viewers 95 and 105 can view both the first and displays of the relevant views shown in FIGS. 9 and 10 at the same time, but the first and second images are not directed towards one another.

Figure 11:
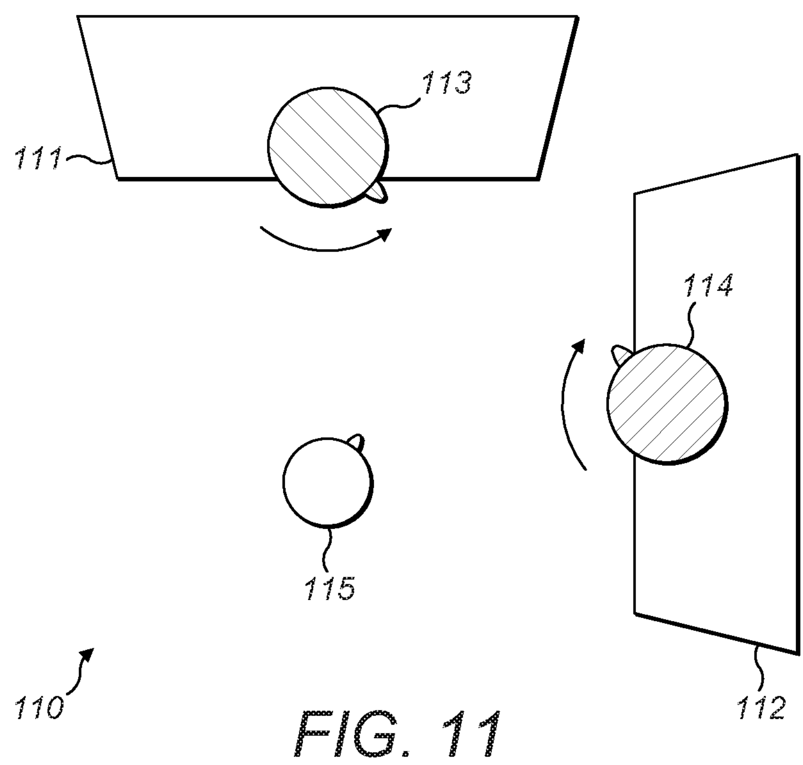

FIG. 11 shows an example view, indicated generally by the reference numeral 110, output by the user device 12 described above with reference to FIG. 1. The view 110 includes a first display 111 that is provided by the front camera 13 and a second display 112 that is provided by the rear camera 14. The first view 111 includes a first image 113 that is a representation of the first object 15. In a similar way, the second view 102 includes a second image 114 that is a representation of the second object 16. A viewer 115 is shown in FIG. 11 and is able to view both the first view 113 and the second view 114.

The view 110 differs from the view 100 in that the first and second three-dimensional models 113 and 114 are rotated so that they are directed towards one another.

Consider again the example of a discussion between two people (the objects 15 and 16). In the example views 90 and 100, the viewers 95 and 105 respectively can see the images of the people involved in the discussion, but those people are not apparently looking at each other (which may appear to be unnatural to the viewer). The view 110, as experienced at the viewpoint of the viewer 115 may be more natural to the viewer, since the images 113 and 114 of the objects 15 and 16 are rotated such that they appear as being directed towards one another.

Figure 12:
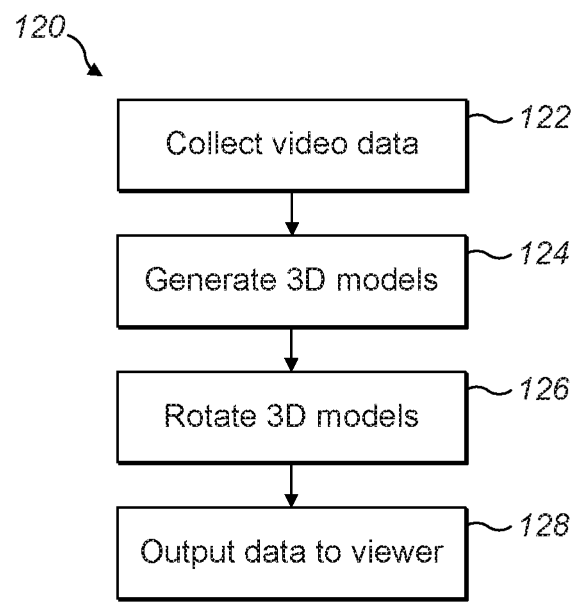
FIG. 12 is a flow chart showing an algorithm in accordance with an example embodiment.

FIG. 12 is a flow chart showing an algorithm, indicated generally by the reference numeral 120, in accordance with an example embodiment. The algorithm 120 may be used to generate the view 110 described above.

The algorithm 120 starts at operation 122 where video data is collected by the front camera 13 and rear camera 14 of the user device 12.

At operation 124, three-dimensional models are generated from the two-dimensional video data captured by the front and rear cameras 13 and 14.

Many algorithms exist for generating a three-dimensional model from a two-dimensional image. By way of example, techniques exist for extrapolating from datasets of 2-dimensional and 3-dimensional facial models or scans for converting between an obtained 2-dimensional image and a 3-dimensional model. For example, techniques have been developed for using a convolutional neural network (CNN) for constructing a 3-dimensional facial model from a single 2-dimensional image, given an appropriate dataset consisting of 2D and 3D facial models or scans. It should be noted, however, that the video data captured by the cameras 13 and 14 described herein provide more input data than a single 2D facial image and so other algorithms may also be appropriate for implementing the operation 124.

At operation 126, the three-dimensional models generated in operation 124 are rotated so that, from the position of the viewer 115, the first and second three-dimensional images 113 and 114 appear to be directed towards one another.

With the three-dimensional models generated in operation 124 and the positions of the first display 111, second display 112 and viewer 115 known, the appropriate rotation of the first and second images 113 and 114 is relatively simple.

Finally, at operation 128, data is output to the viewer.

Any of the views 90, 100 and 110 could be virtual views provide within a virtual reality or augmented reality environment. In this context, the first and second displays may be provided as different parts of a single overall display provided to the viewer.

As shown in FIGS. 9 to 11, the first and second displays are orientated at approximately 90 degrees from one another. This is not essential to all forms of the invention. (A larger or smaller angle, for example 80 degrees or 120 degrees, could be used.) An advantage of providing a relatively large angle between the first and second displays 111 and 112 is that the angle by which the first and second images 113 and 114 will need to be rotated is relatively small. A small rotation of a three-dimensional model may be easier to generate at high quality than a large rotation of such a model.

The embodiments described above have assumed that the first and second cameras 13 and 14 generate two-dimensional outputs. Of course, if the cameras provide three-dimensional image data, then the 2D-3D conversion operation 124 described above may be omitted.

It should be noted that the algorithms 80 and 120 may be combined. For example, if one or both of the objects is orientated at an angle related to the respective camera(s) (the arrangement shown in FIG. 5, rather than the arrangement shown in FIG. 1), then the amount by which the respective three-dimensional model(s) need to be rotated in step 126 may be adjusted accordingly.

Figure 13:
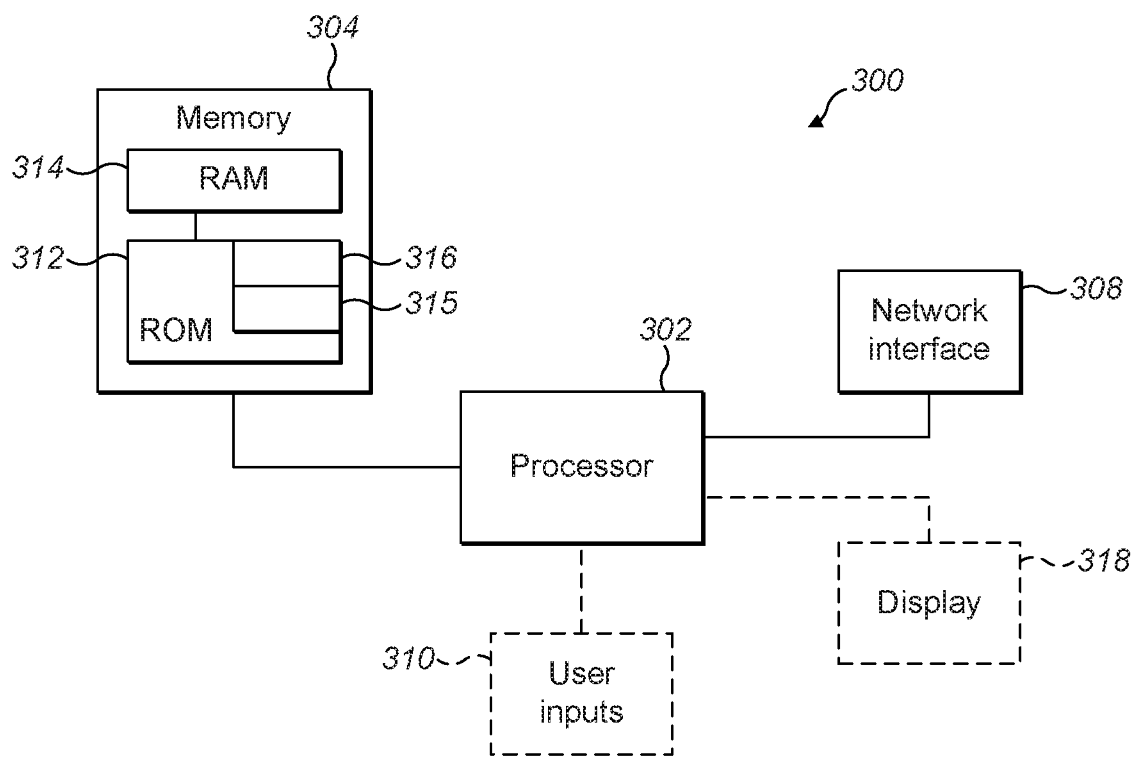
FIG. 13 is a block diagram of components of a processing system in accordance with an example embodiment.

For completeness, FIG. 13 is a schematic diagram of components of one or more of the modules described previously (e.g. implementing some or all of the operations of the algorithms 80 and 120 described above), which hereafter are referred to generically as processing systems 300. A processing system 300 may have a processor 302, a memory 304 closely coupled to the processor and comprised of a RAM 314 and ROM 312, and, optionally, user input 310 and a display 318. The processing system 300 may comprise one or more network interfaces 308 for connection to a network, e.g. a modem which may be wired or wireless.

The processor 302 is connected to each of the other components in order to control operation thereof.

The memory 304 may comprise a non-volatile memory, such as a hard disk drive (HDD) or a solid state drive (SSD). The ROM 312 of the memory 314 stores, amongst other things, an operating system 315 and may store software applications 316. The RAM 314 of the memory 304 is used by the processor 302 for the temporary storage of data. The operating system 315 may contain code which, when executed by the processor implements aspects of the algorithms 80 and 120 described above.

The processor 302 may take any suitable form. For instance, it may be a microcontroller, plural microcontrollers, a processor, or plural processors.

The processing system 300 may be a standalone computer, a server, a console, or a network thereof.

In some embodiments, the processing system 300 may also be associated with external software applications. These may be applications stored on a remote server device and may run partly or exclusively on the remote server device. These applications may be termed cloud-hosted applications (an example of such an application is an application to manage child filters restricting access to use during certain times or access websites from a child's mobile phone, as described above). The processing system 300 may be in communication with the remote server device in order to utilize the software application stored there.

Figure 14A:
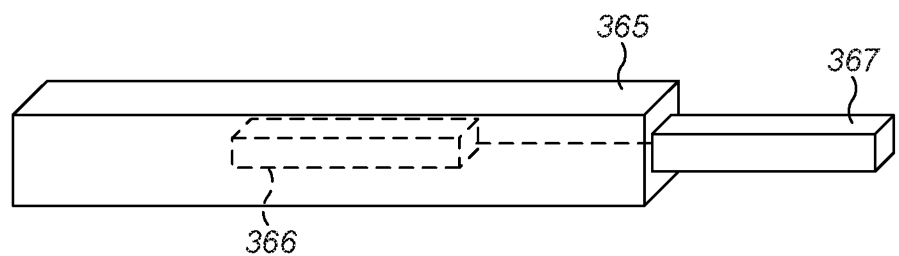
FIGS. 14*a* and 14*b* show tangible media, respectively a removable memory unit and a compact disc (CD) storing computer-readable code which when run by a computer performs operations according to example embodiments.
Figure 14B:
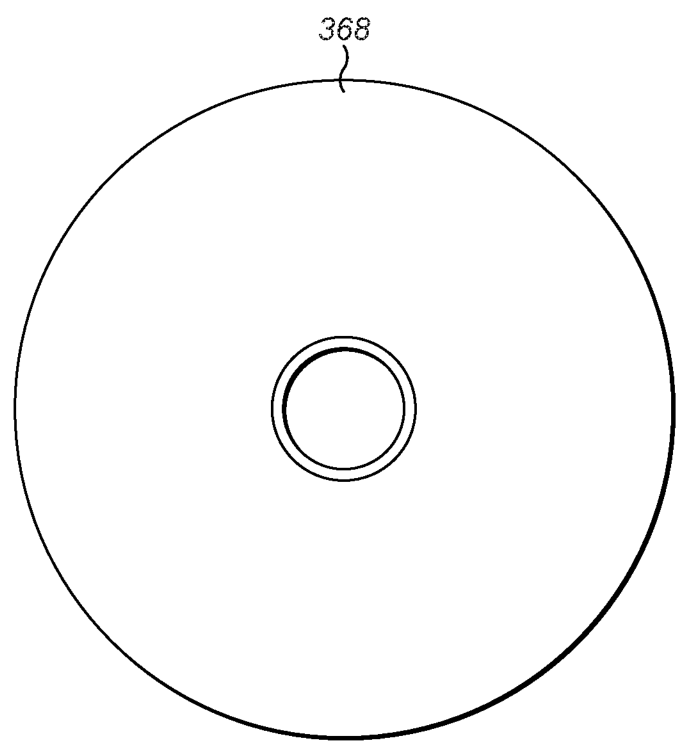

FIGS. 14*a* and 14*b* show tangible media, respectively a removable memory unit 365 and a compact disc (CD) 368, storing computer-readable code which when run by a computer may perform methods according to embodiments described above. The removable memory unit 365 may be a memory stick, e.g. a USB memory stick, having internal memory 366 storing the computer-readable code. The memory 366 may be accessed by a computer system via a connector 367. The CD 368 may be a CD-ROM or a DVD or similar. Other forms of tangible storage media may be used.

Embodiments of the present invention may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any non-transitory media or means that can contain, store, communicate, propagate or transport the instructions for use by or in connection with an instruction execution system, apparatus, or device, such as a computer.

Reference to, where relevant, "computer-readable storage medium", "computer program product", "tangibly embodied computer program" etc., or a "processor" or "processing circuitry" etc. should be understood to encompass not only computers having differing architectures such as single/multi-processor architectures and sequencers/parallel architectures, but also specialised circuits such as field programmable gate arrays FPGA, application specify circuits ASIC, signal processing devices and other devices. References to computer program, instructions, code etc. should be understood to express software for a programmable processor firmware such as the programmable content of a hardware device as instructions for a processor or configured or configuration settings for a fixed function device, gate array, programmable logic device, etc.

As used in this application, the term "circuitry" refers to all of the following: (a) hardware-only circuit implementations (such as implementations in only analogue and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a server, to perform various functions) and (c) to circuits, such as a microprocessor(s) or a portion of a microprocessor(s), that require software or firmware for operation, even if the software or firmware is not physically present.

If desired, the different functions discussed herein may be performed in a different order and/or concurrently with each other. Furthermore, if desired, one or more of the above-described functions may be optional or may be combined. Similarly, it will also be appreciated that the flow diagrams of FIGS. 8 and 12 are examples only and that various operations depicted therein may be omitted, reordered and/or combined.

It will be appreciated that the above described example embodiments are purely illustrative and are not limiting on the scope of the invention. Other variations and modifications will be apparent to persons skilled in the art upon reading the present specification.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes various examples, these descriptions should not be viewed in a limiting sense. Rather, there are several variations and modifications which may be made without departing from the scope of the present invention as defined in the appended claims.

The invention claimed is:

1. An apparatus comprising:

at least one processor; and at least one memory including computer program code, the at least one memory and the computer program code configured, with the at least one processor, to cause the apparatus to perform:

presenting a first part of a video output to a viewer, wherein the first part of the video output is based on a first input, wherein the first input is obtained from a front camera of a user device, wherein the first input is a video of first object having a first orientation with respect to the front camera;

presenting a second part of a video output to the viewer, wherein the second part of the video output is based on a second input, wherein the second input is obtained from a rear camera of the user device, wherein the second input is a video of a second object having a second orientation with respect to the rear camera; and configuring the first and second parts of the video outputs relative to a viewpoint of a first viewer, such that, at the viewpoint: the first and second parts of the video output are visible at the same time, and the first object in the first video output is orientated towards the second object in the second video output.

2. An apparatus as claimed in claim 1, wherein relative positions of the first and second displays are determined by said configuring.

3. An apparatus as claimed in claim 1, wherein the first part of the video output includes a face of the first object and the second part of the video output includes a face of the second object, wherein the configuring presents the video output such that the first object in the first part of the video output is orientated towards the second object in the second part of the video output by orientating the first and second parts of the video outputs such that the faces of the first and second objects are directed towards one another.

4. An apparatus as claimed in claim 1, wherein the at least one memory and the computer program code are further configured, with the at least one processor, to cause the apparatus to perform:

determining the first orientation by determining a first angle between the orientation of the first object and the first camera; and determining the second orientation by determining a second angle between the orientation of the second object and the second camera, wherein the first part of the video output is rotated based on the first angle and the second part of the video output is rotated based on the second angle.

5. An apparatus as claimed in claim 4, wherein the orientations of the first and second objects are determined from a detected eye or face direction relative to the first and second cameras respectively.

6. An apparatus as claimed in claim 1, wherein the configuring comprises:

generating a three-dimensional model of the first object from the first input and a three-dimensional model of the second object from the second input, wherein the first and second parts of the video output include the three-dimensional models of the first and second objects respectively; and orientating the first part of the video output and the second part of the video output by rotating the three-dimensional models of the first and/or second objects such that, at the viewpoint, the models of the first and second objects are directed towards each other.

7. An apparatus as claimed in claim 1, wherein the viewpoint of the first viewer is variable.

8. An apparatus as claimed in claim 1, wherein the video output is a virtual output, wherein the at least one memory and the computer program code are further configured, with the at least one processor, to cause the apparatus to perform presenting the video output within a virtual reality environment.

9. An apparatus as claimed in claim 1, wherein the first and second inputs are received at the same time.

10. An apparatus as claimed in claim 1, wherein the user device is a mobile communication device.

11. An apparatus comprising:

at least one processor; and at least one memory including computer program code, the at least one memory and the computer program code configured, with the at least one processor, to cause the apparatus to perform:

receiving a first input and a second input from a front camera and a rear camera respectively of a user device, wherein: the first input is a video of a first object having a first orientation with respect to the front camera, the second input is a video of a second object having a second orientation with respect to the rear camera;

generating a video output comprising a first part based on the first input and a second part based on the second input; and presenting the video output relative to a viewpoint of a first viewer, such that, at the viewpoint, the first and second parts of the video output are visible at the same time and the first object in the first part of the video output is orientated towards the second object in the second part of the video output.

12. A method comprising:

receiving a first input and a second input from a front camera and a rear camera respectively of a user device, wherein: the first input is a video of a first object having a first orientation with respect to the front camera, the second input is a video of a second object having a second orientation with respect to the rear camera;

generating a video output comprising a first part based on the first input and a second part based on the second input; and presenting the video output relative to a viewpoint of a first viewer, such that, at the viewpoint, the first and second parts of the video output are visible at the same time and the first object in the first part of the video output is orientated towards the second object in the second part of the video output.

13. A method as claimed in claim 12, wherein the first part of the video output includes a face of the first object and the second part of the video output includes a face of the second object, wherein presenting the video output, such that the first object in the first part of the video output is orientated towards the second object in the second part of the video output, comprises orientating the first and second parts of the video outputs such that, at the viewpoint, the faces of the first and second objects are directed towards one another.

14. A method as claimed in claim 12, further comprising:

determining the first orientation by determining a first angle between the orientation of the first object and the first camera; and determining the second orientation by determining a second angle between the orientation of the second object and the second camera, wherein the first part of the video output is rotated based on the first angle and the second part of the video output is rotated based on the second angle.

15. A method as claimed in claim 14, wherein the orientations of the first and second objects are determined from a detected eye or face direction relative to the first and second cameras respectively.

16. A method as claimed in claim 12, further comprising:

generating a three-dimensional model of the first object from the first input; and generating a three-dimensional model of the second object from the second input, wherein: the first and second parts of the video output include the three-dimensional models of the first and second objects respectively; and presenting the video output such that the first object in the first video output is orientated towards the second object in the second video output comprises rotating the three-dimensional models of the first and/or second objects such that, at the viewpoint, the models of the first and second objects are directed towards each other.

17. A method as claimed in claim 12, wherein the viewpoint of the first viewer is variable.

18. A method as claimed in claim 12, wherein the video output is a virtual output, wherein presenting the video includes presenting the video output in a virtual reality environment.

19. A method as claimed in claim 12, wherein the first and second inputs are received at the same time.

20. A non-transitory computer-readable medium having computer-readable code stored thereon, the computer readable code, when executed by the at least one processor, causes performance of:

receiving a first input and a second input from a front camera and a rear camera respectively of a user device, wherein: the first input is a video of a first object having a first orientation with respect to the front camera, the second input is a video of a second object having a second orientation with respect to the rear camera;

generating a video output comprising a first part based on the first input and a second part based on the second input; and presenting the video output relative to a viewpoint of a first viewer, such that, at the viewpoint, the first and second parts of the video output are visible at the same time and the first object in the first part of the video output is orientated towards the second object in the second part of the video output.

* * * * *